(12) United States Patent
Lara Sandoval et al.

(10) Patent No.: US 11,268,634 B1
(45) Date of Patent: Mar. 8, 2022

(54) CLAMP FOR A VEHICLE

(71) Applicant: Ford Global Technologies, LLC, Dearborn, MI (US)

(72) Inventors: Jezahel Martin Lara Sandoval, Mexico City (MX); Carlos Perez Lecuona, Mexico City (MX); Fernando Paisano Rodriguez, San Andres Cholula (MX); Federico Perez Lecuona, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/094,067

(22) Filed: Nov. 10, 2020

(51) Int. Cl.
 *F16L 3/12* (2006.01)

(52) U.S. Cl.
 CPC .................................. *F16L 3/1211* (2013.01)

(58) Field of Classification Search
 CPC . F16L 3/1211; F16L 3/137; F16L 3/13; F16L 3/12; F16L 3/1075; F16L 3/10; F16L 3/1008; F16L 3/1025; F16L 3/1033; F16L 3/1041; F16L 3/1058
 USPC ....................................................... 248/74.1
 See application file for complete search history.

(56) References Cited

U.S. PATENT DOCUMENTS

| | | | |
|---|---|---|---|
| 3,516,631 A * | 6/1970 | Santucci | H02G 3/32 248/71 |
| 3,637,177 A * | 1/1972 | Santucci | F16L 3/08 248/74.3 |
| 3,913,187 A | 10/1975 | Okuda | |
| 3,942,750 A * | 3/1976 | Noorily | F16L 3/233 248/74.3 |
| 4,183,120 A | 1/1980 | Thorne | |
| 4,439,896 A * | 4/1984 | Matsui | F16L 3/08 24/16 PB |
| 4,564,163 A * | 1/1986 | Barnett | F16L 3/12 24/16 PB |
| 4,609,171 A * | 9/1986 | Matsui | F16L 3/12 24/16 PB |
| 5,333,361 A * | 8/1994 | Schaede | A41F 9/007 24/182 |
| 5,775,653 A | 7/1998 | Horney | |
| 6,126,119 A | 10/2000 | Giangrasso | |
| 6,164,605 A | 12/2000 | Drake | |
| 6,266,852 B1 * | 7/2001 | Tai | B65D 63/1027 24/16 PB |
| 8,056,868 B2 * | 11/2011 | Vander Griend | F16L 3/1075 248/74.2 |
| 8,286,923 B2 * | 10/2012 | Kobayashi | F16L 3/12 248/74.2 |

(Continued)

FOREIGN PATENT DOCUMENTS

JP 2013124733 A 6/2013

*Primary Examiner* — Christopher Garft
(74) *Attorney, Agent, or Firm* — Vichit Chea; Price Heneveld LLP

(57) ABSTRACT

A clamp includes a body extending between a receiver end and an engagement end, an outer receiver member extending outward from the body to define a receiver proximate to the receiver end between the outer receiver member and the body, an engagement feature coupled to the body proximate the engagement end and configured to be received by the receiver, and a gusset feature coupled to the body and the outer receiver member. The gusset feature extends across the receiver from the outer receiver member to the body.

11 Claims, 3 Drawing Sheets

(56) References Cited

U.S. PATENT DOCUMENTS

| | | | |
|---|---|---|---|
| 2004/0108421 A1* | 6/2004 | Yuta | B60R 13/0237 |
| | | | 248/71 |
| 2009/0045300 A1* | 2/2009 | Vander Griend | F16L 3/1075 |
| | | | 248/62 |
| 2014/0151514 A1* | 6/2014 | Asai | H02G 3/34 |
| | | | 248/74.1 |
| 2017/0297516 A1* | 10/2017 | Loebe | F16L 3/1075 |
| 2018/0093806 A1* | 4/2018 | Fossey | B65D 63/1072 |
| 2019/0190204 A1* | 6/2019 | Chang | F16L 3/137 |
| 2020/0194987 A1* | 6/2020 | Gu | F16L 3/13 |

* cited by examiner

CLAMP FOR A VEHICLE

FIELD OF THE DISCLOSURE

The present disclosure is generally related to a clamp for use in a vehicle. More specifically, the present disclosure generally relates to a clamp for a vehicle that is configured to receive a generally cylindrical member.

BACKGROUND OF THE DISCLOSURE

Vehicles often include generally cylindrical members, such as pipes. A clamp configured to engage generally cylindrical members and having a gusset feature that allows for varying amounts of clamping strength may be desired.

SUMMARY OF THE DISCLOSURE

According to a first aspect of the present disclosure, a clamp includes a body having interior and exterior surfaces and extending from a receiver end to an engagement end. The clamp also includes an outer receiver member having a proximal end coupled to the exterior surface of the body between the receiver end and the engagement end, and a distal end positioned proximate to the receiver end. The outer receiver member extends along the exterior surface of the body from the proximal end to the distal end to define a receiver between the outer receiver member and the body. The clamp further includes an engagement feature coupled to the body proximate to the engagement end and operable between an engaged condition and a disengaged condition. In the engaged condition, the engagement feature is engaged with the receiver. In the disengaged condition, the engagement feature is disengaged from the receiver. The clamp includes a gusset feature coupled to the outer receiver member and the body. The gusset feature extends across the receiver from the outer receiver member to the body.

Embodiments of the first aspect of the present disclosure may include any one or a combination of the following features:
- the engagement feature includes an engagement detent extending outward from the exterior surface of the body, wherein in the engaged condition, the engagement detent is configured to be engaged with the outer receiver member and positioned within the receiver;
- the receiver includes a neck portion proximate to the distal end of the outer receiver member and a bulb portion in communication with the neck portion and proximate to the proximal end of the outer receiver member;
- the gusset feature extends across the bulb portion of the receiver;
- a plurality of ribs coupled to the interior surface of the body and configured to engage a generally cylindrical member in the engaged condition of the engagement feature, wherein at least one of the plurality of ribs is coupled to the interior surface of the body between the receiver end of the body and the proximal end of the outer receiver member;
- the gusset feature is integrally coupled to the outer receiver member and integrally coupled to the body; and
- the body includes a living hinge, a clamp arm extending from the living hinge to the engagement end of the body, and a support arm extending from the living hinge to the receiver end of the body, wherein the clamp arm is operable to pivot via the living hinge relative to the support arm to move the engagement feature between engaged and disengaged conditions.

According to a second aspect of the present disclosure, a vehicle component includes a panel and a clamp coupled to the panel. The clamp includes a body extending between a receiver end and an engagement end, an outer receiver member extending outward from the body to define a receiver proximate to the receiver end between the outer receiver member and the body, an engagement feature coupled to the body proximate the engagement end and operable to enter an engaged condition, and a gusset feature coupled to the body and the outer receiver member. In the engaged condition, the engagement feature is received within the receiver. The gusset feature extends across the receiver from the outer receiver member to the body.

Embodiments of the second aspect of the present disclosure may include any one or a combination of the following features:
- the clamp is integrally coupled to the panel;
- the clamp is integrally coupled to the panel via a plurality of connecting features that extend between the clamp and the panel;
- at least one of the plurality of connecting features extends between the panel and the outer receiver member;
- the outer receiver member includes a proximal end coupled to the body between the receiver end and the engagement end and a distal end positioned proximate to the receiver end, wherein the outer receiver member extends along the body from the proximal end to the distal end to define the receiver between the outer receiver member and the body;
- the receiver includes a neck portion proximate to the distal end of the outer receiver member and a bulb portion in communication with the neck portion and proximate to the proximal end of the outer receiver member; and
- the gusset feature extends across the bulb portion of the receiver.

According to a third aspect of the present disclosure, a clamp includes a body extending between a receiver and an engagement end, an outer receiver member extending outward from the body to define a receiver proximate to the receiver end between the outer receiver member and the body, an engagement feature coupled to the body proximate the engagement end and configured to be received by the receiver, and a gusset feature coupled to the body and the outer receiver member. The gusset feature extends across the receiver from the outer receiver member to the body.

Embodiments of the third aspect of the present disclosure may include any one or a combination of the following features:
- the outer receiver member includes a proximal end coupled to the body between the receiver end and the engagement end and a distal end positioned proximate to the receiver end, wherein the outer receiver member extends along the body from the proximal end to the distal end to define the receiver between the outer receiver member and the body;
- the receiver includes a neck portion proximate to the distal end of the outer receiver member, and a bulb portion in communication with the neck portion and proximate to the proximal end of the outer receiver member;
- the gusset feature extends across the bulb portion of the receiver;
- a plurality of ribs coupled to the body and configured to engage a generally cylindrical member in an engaged condition of the engagement feature, wherein at least one of the plurality of ribs is coupled to the body between the receiver end of the body and the proximal end of the outer receiver member; and the gusset feature is integrally coupled to the outer receiver member and integrally coupled to the body.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
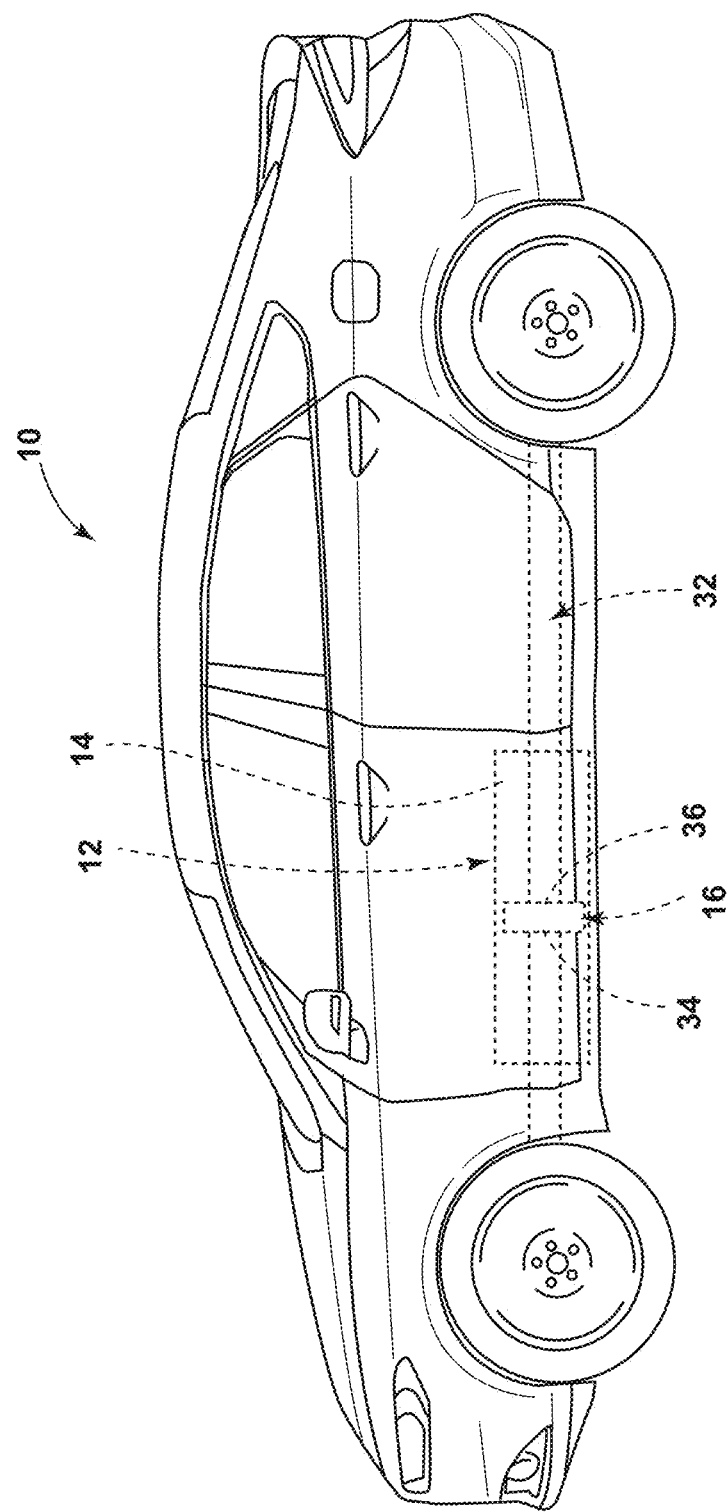
FIG. 1 is a side elevational view of a vehicle, illustrating a generally cylindrical member and a clamp disposed about the generally cylindrical member and coupled to a panel of the vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, a vehicle 10 includes a vehicle component 12. The vehicle component 12 includes a panel 14 and a clamp 16 coupled to the panel 14. The clamp 16 includes a body 18 that extends between a receiver end 20 and an engagement end 22. The clamp 16 includes an outer receiver member 24 that extends outward from the body 18 to define a receiver 26 that is proximate to the receiver end 20 between the outer receiver member 24 and the body 18. The clamp 16 includes an engagement feature 28 coupled to the body 18 proximate to the engagement end 22. The engagement feature 28 is operable to enter an engaged condition, wherein the engagement feature 28 is received within the receiver 26. The clamp 16 includes a gusset feature 30 that is coupled to the body 18 and the outer receiver member 24. The gusset feature 30 extends across the receiver 26 from the outer receiver member 24 to the body 18.

Referring now to FIGS. 1-5, the clamp 16 is illustrated. The clamp 16 may be configured to engage or clamp about an exterior circumference of a generally cylindrical member 32. The clamp 16 includes a first surface 34 and a second surface 36 opposite the first surface 34. As viewed in FIGS. 4 and 5, the first surface 34 of the clamp 16 faces the viewer, and the second surface 36 faces away from the viewer. In various embodiments, the clamp 16 extends from the first surface 34 to the second surface 36 in a direction that is parallel to a direction that the generally cylindrical member 32 extends through the clamp 16, as illustrated in FIG. 1.

Figure 3:
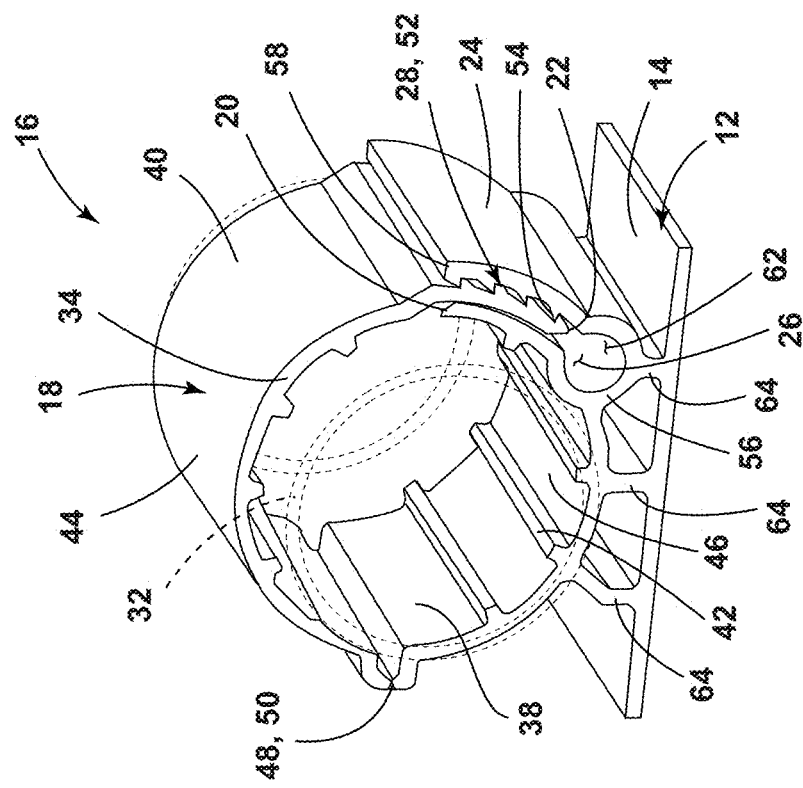
FIG. 3 is a perspective view of the clamp engaging a generally cylindrical member, illustrating the engagement feature received within the receiver of the clamp in the engaged condition, according to one embodiment.
Figures 4, 5:
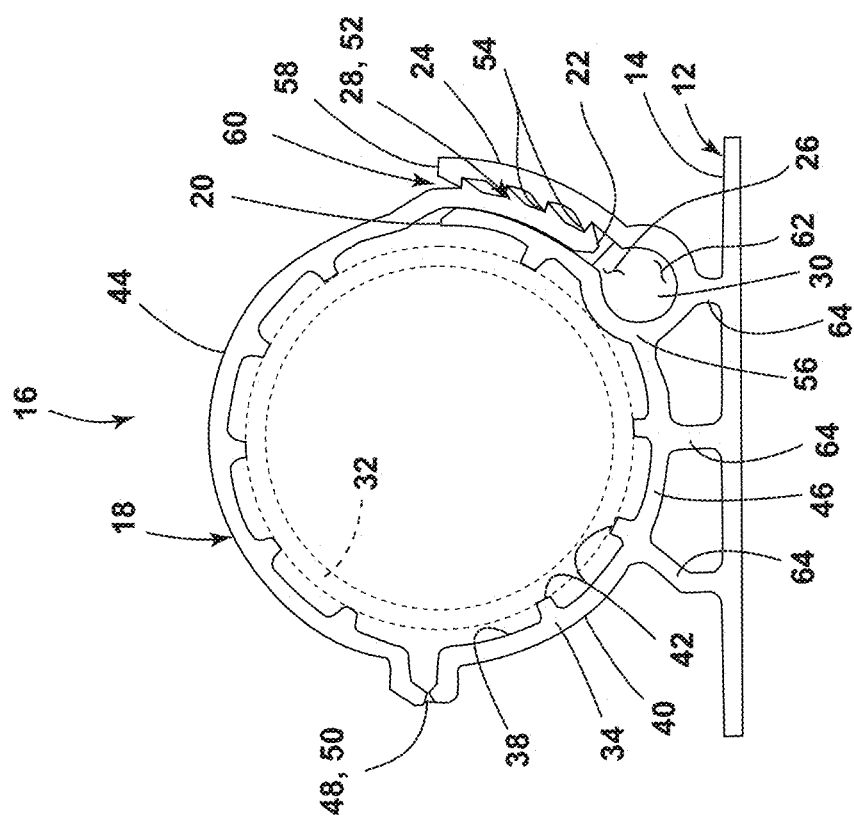
FIG. 4 is a front elevational view of the clamp coupled to the panel, illustrating the engagement feature in the disengaged condition relative to the receiver of the clamp, according to one embodiment.
FIG. 5 is a front elevational view of the clamp coupled to the panel, illustrating the engagement feature received within the receiver of the clamp in the engaged condition, such that the clamp engages the generally cylindrical member, according to one embodiment.

In various embodiments, the clamp 16 includes the body 18 and the outer receiver member 24 coupled to the body 18. As illustrated in FIGS. 2-5, the body 18 extends from the receiver end 20 to the engagement end 22 and includes an interior surface 38 and an exterior surface 40 that is opposite the interior surface 38. In various implementations, the interior surface 38 of the body 18 may interface with and/or be engaged with the generally cylindrical member 32 within the clamp 16, as depicted in FIGS. 3 and 5. In some embodiments, a plurality of ribs 42 may be coupled to the interior surface 38 of the body 18 and configured to engage the generally cylindrical member 32. For example, as illustrated in FIGS. 2-5, a plurality of ribs 42 are integrally coupled with the body 18 and extend outward from the interior surface 38 of the body 18.

In some embodiments, the body 18 includes a clamp arm 44 coupled to a support arm 46 by a hinge feature 48. The hinge feature 48 may be a living hinge 50 that is integrally coupled to the support arm 46 and the clamp arm 44. As illustrated in FIGS. 2-5, the support arm 46 extends from the receiver end 20 of the body 18 to the living hinge 50, and the clamp arm 44 extends from the living hinge 50 to the engagement end 22 of the body 18. In some examples, the clamp arm 44 may be configured to pivot relative to the support arm 46 via the hinge feature 48 between a variety of positions, as described further herein.

Referring now to FIGS. 2-5, the clamp 16 may include the engagement feature 28. The engagement feature 28 may be coupled to the body 18 proximate to the engagement end 22. For example, the engagement feature 28 may include an engagement detent 52 that is integrally coupled with the body 18 and that extends outward from the exterior surface 40 of the body 18 proximate to the engagement end 22. In the embodiment illustrated in FIG. 2, the engagement feature 28 includes a plurality of engagement detents 52 that extend outward from the exterior surface 40 of the body 18 proximate to the engagement end 22. As described further herein, the one or more engagement detents 52 may be configured to engage with one or more receiver detents 54 to maintain the engagement feature 28 in the engaged condition. A variety of types of engagement features 28 configured to be engaged with the receiver 26 of the clamp 16 are contemplated.

Referring still to FIGS. 2-5, in various embodiments, the outer receiver member 24 is coupled to the body 18 of the clamp 16 between the receiver end 20 and the engagement end 22 of the body 18. In various embodiments, the outer receiver member 24 is coupled to the support arm 46 of the body 18 between the hinge feature 48 and the receiver end 20 of the body 18. As illustrated in FIGS. 2-5, the outer receiver member 24 includes a proximal end 56 that is coupled to the exterior surface 40 of the body 18. The outer receiver member 24 extends from the proximal end 56 to a distal end 58 of the outer receiver member 24. The distal end 58 may be positioned proximate to the receiver end 20 of the body 18. In various embodiments, the proximal end 56 of the outer receiver member 24 is coupled to the exterior surface 40 of the body 18, and the outer receiver member 24 extends outward from the proximal end 56 along the exterior surface 40 of the body 18 to the distal end 58 of the outer receiver member 24, such that the receiver 26 is defined between the outer receiver member 24 and the body 18. For example, as illustrated in FIGS. 2-5, the receiver 26 is defined by the portion of the exterior surface 40 of the body 18 that is between the proximal end 56 of the outer receiver member 24 and the receiver end 20 of the body 18 and the portion of the outer receiver member 24 facing the exterior surface 40 of the body 18. As illustrated in FIGS. 2-5, in some embodiments, at least one rib 42 may be coupled to and/or extend outward from the interior surface 38 of the portion of the body 18 that extends between the proximal end 56 of the outer receiver member 24 and the receiver end 20 of the body 18.

As illustrated in FIGS. 2-5, in some embodiments, the receiver 26 includes a neck portion 60 and a bulb portion 62 in communication with the neck portion 60. The neck portion 60 may be proximate to the distal end 58 of the outer receiver member 24 and/or the receiver end 20 of the body 18. For example, as illustrated in FIG. 4, the neck portion 60 of the receiver 26 starts between the distal end 58 and the receiver end 20 and extends therefrom to the bulb portion 62, which is positioned proximate to the proximal end 56 of the outer receiver member 24. As illustrated in FIG. 4, the neck portion 60 of the receiver 26 is a narrow elongated gap between the outer receiver member 24 and the exterior surface 40 of the body 18, while the bulb portion 62 widens relative to the neck portion 60 and has a generally circular profile that is interrupted by the neck portion 60 of the receiver 26. As illustrated in FIG. 4, the first surface 34 of the portion of the clamp 16 that defines the bulb portion 62 of the receiver 26 is c-shaped. The portions of the clamp 16 that define the neck portion 60 extend outward generally parallel to each other from the ends of the c-shaped portion.

Referring still to FIGS. 2-5, the clamp 16 may include the receiver detent 54. In some embodiments, the clamp 16 may include a plurality of receiver detents 54. For example, as illustrated in FIG. 4, a plurality of receiver detents 54 are coupled to the outer receiver member 24 and extend outward therefrom into the receiver 26. In the illustrated embodiment, the receiver detents 54 are coupled to the portion of the outer receiver member 24 that defines the neck portion 60 of the receiver 26, and the portions of the clamp 16 that define the bulb portion 62 of the receiver 26 do not include receiver detents 54. The one or more receiver detents 54 may be configured to be engaged with the one or more engagement detents 52 to retain the engagement feature 28 within the receiver 26, as described further herein. It is contemplated that the receiver detents 54 may be coupled to various portions of the clamp 16. For example, the receiver detents 54 may be coupled to the exterior surface 40 of the body 18 between the proximal end 56 of the outer receiver member 24 and the receiver end 20 of the body 18, in some embodiments.

Figure 2:
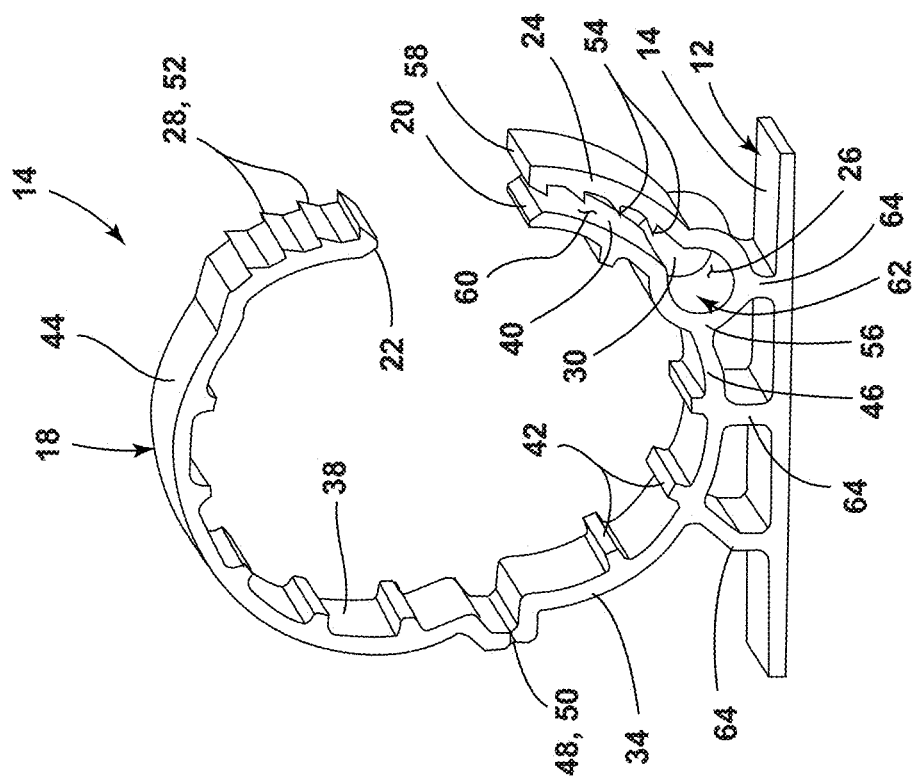
FIG. 2 is a perspective view of a clamp coupled to a panel of a vehicle, illustrating an engagement feature in a disengaged condition relative to a receiver of the clamp, according to one embodiment.

In various embodiments, the engagement feature 28 may be operable between a disengaged condition, wherein the engagement feature 28 is not received within and/or engaged with the receiver 26, as illustrated in FIGS. 2 and 4, and an engaged condition, wherein the engagement feature 28 is received within and/or engaged with the receiver 26, as illustrated in FIGS. 3 and 5. In the engaged condition, the engagement end 22 of the body 18 is received within the receiver 26, and the engagement feature 28 is engaged with the receiver 26, such that the engagement feature 28 generally prevents removal of the engagement end 22 of the body 18 from the receiver 26. In the examples illustrated in FIGS. 3 and 5, the engagement end 22 of the body 18 is received within the neck portion 60 of the receiver 26, and the engagement detents 52 coupled to the exterior surface 40 of the body 18 are positively engaged with the receiver detents 54 coupled to the portion of outer receiver member 24 that defines the neck portion 60 of the receiver 26. The engagement between the engagement detents 52 and the receiver detents 54 retains the engagement end 22 within the receiver 26, which keeps the body 18 of the clamp 16 engaged with the generally cylindrical member 32 disposed within the clamp 16.

In various embodiments, the outer receiver member 24 may be configured to resiliently deform to allow the engagement end 22 of the body 18 to be received within the receiver 26. For example, the outer receiver member 24 may resiliently flex generally away from the exterior surface 40 of the body 18, to widen the neck portion 60 of the receiver 26. After the engagement end 22 of the body 18 is inserted into the widened neck portion 60 of the receiver 26, the outer receiver member 24 may resiliently rebound back toward an at rest position nearer to the exterior surface 40 of the body 18, so that the receiver detents 54 become engaged with the engagement detents 52.

Referring still to FIGS. 2-5, in various embodiments, the clamp 16 includes the gusset feature 30. The gusset feature 30 may be coupled to the body 18 and the outer receiver member 24 and may extend across the receiver 26 from the outer receiver member 24 to the body 18. In some embodiments, the gusset feature 30 may extend across the bulb portion 62 of the receiver 26. For example, as illustrated in FIGS. 4 and 5, the gusset feature 30 extends across the entire profile of the bulb portion 62, and a portion of the profile of the neck portion 60 proximate to the bulb portion 62. It is contemplated that the gusset feature 30 may extend across a portion of the bulb portion 62 and/or a portion of the neck portion 60, in various embodiments. In various embodiments, the gusset feature 30 is coupled to the clamp 16 proximate to the second surface 36 of the clamp 16 and is in a spaced relationship with the first surface 34 of the clamp 16. For example, as illustrated in FIG. 2, the gusset feature 30 is integrally coupled with the body 18 and the outer receiver member 24, such that a surface of the gusset feature 30 facing away from the receiver 26 is part of the second surface 36 of the clamp 16, and the opposite surface of the gusset feature 30 is spaced apart from the first surface 34 of the clamp 16 and defines the bulb portion 62 of the receiver 26 together with the exterior surface 40 of the body 18 and the outer receiver member 24. In such embodiments, the gusset feature 30 is relatively thin compared to the thickness of the clamp 16 extending from the first surface 34 to the second surface 36, which may aid in deforming the gusset feature 30 or removing the gusset feature 30 from the clamp 16, as described further herein.

In various embodiments, the gusset feature 30 may impart strength to the outer receiver member 24, such that the gusset feature 30 limits the range of resilient deformation of the outer receiver member 24. For example, as illustrated in FIGS. 2-5, the gusset feature 30 extends across the bulb portion 62 of the receiver 26 from the body 18 of the clamp 16 to the outer receiver member 24. In doing so, the gusset feature 30 substantially inhibits deformation of the portion of the outer receiver member 24 that defines the bulb portion 62. Accordingly, when force is applied to the outer receiver member 24 to move the outer receiver member 24 away from the exterior surface 40 of the body 18, deformation stress is concentrated in the portion of the outer receiver member 24 that defines the neck portion 60 of the receiver 26. This increases the strength of the outer receiver member 24, such that the outer receiver member 24 is less easily moved away from the exterior surface 40 of the body 18.

In some implementations, the gusset feature 30 may be permanently deformed (e.g., cut, torn, stretched, etc.) or removed from the clamp 16 by a user to increase the range of resilient deformation and/or decrease the strength of the outer receiver arm 24. By removing the gusset feature 30 from the clamp 16, the deformation stress that would have been concentrated in the portion of the outer receiver member 24 that defines the neck portion 60 is concentrated instead in the portion of the outer receiver member 24 that defines the bulb portion 62 of the receiver 26. This decreases the strength of the outer receiver member 24, such that the outer receiver member 24 is more easily moved away from the exterior surface 40 of the body 18.

Referring now to FIGS. 1-5, the clamp 16 may be coupled to the panel 14 of the vehicle component 12. In various embodiments, the clamp 16 may be integrally coupled to the panel 14. In some examples, the support arm 46 may be integrally coupled with the panel 14. Further, in some examples, the outer receiver member 24 may be integrally coupled with the panel 14. As illustrated in FIGS. 2-5, the clamp 16 is integrally coupled with the panel 14 via a plurality of connecting features 64 that extend between the clamp 16 and the panel 14. In various embodiments, at least one of the plurality of connecting features 64 may be coupled to the exterior surface 40 of the body 18. In some embodiments, at least one of the plurality of connecting features 64 may be coupled to the exterior surface 40 of the support arm 46. In some embodiments, at least one of the plurality of connecting features 64 may be coupled to the outer receiver member 24. In the embodiment illustrated in FIG. 4, two connecting features 64 extend from the panel 14 to the exterior surface 40 of the support arm 46, and one connecting feature 64 extends from the panel 14 to the surface of the outer receiver member 24 that is opposite the bulb portion 62 of the receiver 26. It is contemplated that the clamp 16 may be coupled to the panel 14 in a variety of manners, in various embodiments.

In operation of an exemplary embodiment of the clamp 16 described herein, the clamp 16 is integrally coupled with the panel 14 of the vehicle component 12 and is configured to clamp about the generally cylindrical member 32, which is a component of the vehicle 10, as illustrated in FIG. 1. A user positions the generally cylindrical member 32 adjacent to the interior surface 38 of the support arm 46, such that the generally cylindrical member 32 contacts the ribs 42 coupled to the support arm 46, as illustrated in FIGS. 2 and 4. Next, the user pivots the clamp arm 44 via the living hinge 50, such that the engagement end 22 of the body 18 is received within the receiver 26, and the engagement detents 52 coupled to the exterior surface 40 of the body 18 are engaged with the receiver detents 54 extending into the neck portion 60 of the receiver 26 from the outer receiver member 24. As a result, the clamp arm 44 and the support arm 46 of the body 18 cooperate to clamp about the generally cylindrical member 32, as illustrated in FIGS. 3 and 5. The gusset feature 30 extending across the receiver 26 strengthens the outer receiver member 24, which aids in maintaining the receiver detents 54 in engagement with the engagement detents 52. Upon desiring to remove the generally cylindrical member 32 from the clamp 16, the user may remove the gusset feature 30 from the clamp 16. Removal of the gusset feature 30 may allow the user to more easily manipulate the outer receiver member 24, such that the engagement detents 52 may be disengaged from the receiver detents 54.

The clamp 16 of the present disclosure may provide a variety of advantages. First, the gusset feature 30 may provide rigidity and strength to the outer receiver member 24 when attached and may allow the outer receiver member 24 to deform more freely when removed, which allows the receiver 26 to be tunable to accommodate needs for various uses of the clamp 16. Second, the thinness of the gusset feature 30 relative to the remainder of the clamp 16 may allow for convenient removal of the gusset feature 30 from the clamp 16. Third, the clamp 16 being integrally coupled with the panel 14 of the vehicle component 12 may eliminate the need for a separate part to couple the clamp 16 to the panel 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle component, comprising:
  a panel;
  a clamp, comprising:
    a body having interior and exterior surfaces and extending from a receiver end to an engagement end;
    an outer receiver member having a proximal end that extends outward from the exterior surface of the body between the receiver end and the engagement end, and a distal end positioned proximate to the receiver end, the outer receiver member includes a first portion and a second portion; the first portion extends in a curved manner towards the panel and then in a curved manner away from the panel; the second portion extends from the first portion along the exterior surface of the body to define a receiver;
an engagement feature coupled to the body proximate to the engagement end and operable between an engaged condition, wherein the engagement feature is engaged with the receiver, and a disengaged condition, wherein the engagement feature is disengaged from the receiver; and
a gusset feature coupled to the outer receiver member and the body, wherein the gusset feature extends across the receiver from the outer receiver member to the body; and
a plurality of connecting features that integrally couple the panel to the clamp, wherein at least one of the plurality of connecting features extends from the panel to a portion of the outer receiver member between the proximal and distal ends of the outer receiver member.

2. The clamp of claim 1, wherein the engagement feature comprises:
an engagement detent extending outward from the exterior surface of the body, wherein in the engaged condition, the engagement detent is configured to be engaged with the outer receiver member and positioned within the receiver.

3. The clamp of claim 1, wherein the receiver comprises:
a neck portion proximate to the distal end of the outer receiver member formed by the second portion of the outer receiver member; and
a bulb portion in communication with the neck portion and proximate to the proximal end of the outer receiver member formed by the first portion of the outer receiver member.

4. The clamp of claim 3, wherein the gusset feature extends across the bulb portion of the receiver.

5. The clamp of claim 1, further comprising:
a plurality of ribs coupled to the interior surface of the body and configured to engage a generally cylindrical member in the engaged condition of the engagement feature, wherein at least one of the plurality of ribs is coupled to the interior surface of the body between the receiver end of the body and the proximal end of the outer receiver member.

6. The clamp of claim 1, wherein the gusset feature is integrally coupled to the outer receiver member and integrally coupled to the body.

7. The clamp of claim 1, wherein the body comprises:
a living hinge;
a clamp arm extending from the living hinge to the engagement end of the body; and
a support arm extending from the living hinge to the receiver end of the body, wherein the clamp arm is operable to pivot via the living hinge relative to the support arm to move the engagement feature between engaged and disengaged conditions.

8. A vehicle component, comprising:
a panel; and
a clamp coupled to the panel and comprising:
a body extending between a receiver end and an engagement end;
an outer receiver member having a proximal end that is coupled to the body, and a distal end, wherein the outer receiver member extends outward directly from the body from the proximal end to the distal end; the outer receiver member includes a first portion and a second portion; the first portion extends in a curved manner towards the panel and then in a curved manner away from the panel; the second portion extends from the first portion along the exterior surface of the body to define a receiver;
a connecting feature integrally coupled to the outer receiver member between the proximal and distal ends and extending therefrom to the panel to couple the panel to the clamp;
an engagement feature coupled to the body proximate the engagement end and operable to enter an engaged condition, wherein the engagement feature is received within the receiver; and
a gusset feature coupled to the body and the outer receiver member, wherein the gusset feature extends across the receiver from the outer receiver member to the body.

9. The vehicle component of claim 8, wherein the clamp is integrally coupled to the panel.

10. The vehicle component of claim 8, wherein the receiver comprises:
a neck portion proximate to the distal end of the outer receiver member formed by the second portion of the outer receiver member; and
a bulb portion in communication with the neck portion and proximate to the proximal end of the outer receiver member formed by the first portion of the outer receiver member.

11. The vehicle component of claim 10, wherein the gusset feature extends across the bulb portion of the receiver.

* * * * *